United States Patent [19]
Gusset

[11] 4,198,231
[45] Apr. 15, 1980

[54] RECOVERY AND SEPARATION OF GADOLINIUM AND GALLIUM

[75] Inventor: Erwin Gusset, Thayngen, Switzerland

[73] Assignee: Swiss Aluminium Ltd., Chippis, Switzerland

[21] Appl. No.: 9,644

[22] Filed: Feb. 5, 1979

[30] Foreign Application Priority Data

Feb. 17, 1978 [CH] Switzerland ............... 1738/78

[51] Int. Cl.$^2$ .................. C22B 58/00; C22B 59/00
[52] U.S. Cl. ............................ 75/101 R; 75/109; 75/121; 204/105 R; 423/21.1; 423/111; 423/122
[58] Field of Search .............. 75/121, 109, 101 R; 423/21.1, 21.5, 111, 122; 204/105 R

[56] References Cited

U.S. PATENT DOCUMENTS

| | | | |
|---|---|---|---|
| 1,855,455 | 4/1932 | McCutcheon | 204/105 R |
| 3,170,857 | 2/1965 | Dotzer | 204/105 R |
| 3,506,585 | 4/1970 | Otsuka et al. | 423/21.1 X |
| 3,927,172 | 12/1975 | Stevens | 423/122 |
| 4,071,422 | 1/1978 | Charlton et al. | 75/121 X |

*Primary Examiner*—G. Ozaki
*Attorney, Agent, or Firm*—Bachman and LaPointe

[57] ABSTRACT

Gallium and gadolinium are recovered and separated from scrap material of substances which contain both of these elements in the form of oxides or compounds which can be transformed to the oxides.

The scrap is finely ground and then dissolved in a strong, aqueous mineral acid. The gadolinium is precipitated from the purified solution as the oxalate; then the gallium is deposited in the metallic form by means of electrolysis. The electrolytic deposition of the gallium can also take place before the gadolinium is precipitated out as the oxalate.

10 Claims, No Drawings

RECOVERY AND SEPARATION OF GADOLINIUM AND GALLIUM

BACKGROUND OF THE INVENTION

The invention presented here concerns a process for the recovery and separation of gadolinium and gallium from scrap in the form of substances which contain both of these elements in the form of oxides or compounds which can be transformed to oxides, in particular gadolinium-gallium-garnet (GGG) which has the formula $Gd_3Ga_5O_{12}$.

These substances are used mainly in the manufacture of components for bubble domain memory units. In the manufacturing stage about 80% of the starting material ends up as rejected material or scrap. This is waste material from a relatively expensive compound, and its recovery is of considerable economic interest. If the recovery and processing of the scrap leads to sufficiently pure products, then these can be recycled and used again as starting material. As a result, the economics of the production of GGG wafers can be improved considerably. Under the term "scrap" is to be understood particulate material (remainder of charges used to grow crystals, fragments of crystals from all stages of processing to wafer form) and also fines or powders which are formed during cutting, grinding, polishing etc. the garnet $Gd_3Ga_5O_{12}$ or similar materials.

The digestion of such scrap is a problem which has existed for only a few years and one which has not been solved up to now. All previous attempts have failed because of the slow rate of dissolution of these complex oxides.

SUMMARY OF THE INVENTION

The inventor set himself the task, therefore, to develop a process for the recovery and separation of gadolinium and gallium in a very fine form starting from substances which contain these elements mainly in the form of oxides, in particular complex compounds with a garnet structure. The process should allow economic and straightforward recycling of scrap material.

This object is achieved by way of the invention in that:
(a) the scrap is ground down to a particular size of less than 100 μm,
(b) is dissolved in a strong aqueous mineral acid,
(c) the troublesome impurities are separated out,
(d) the gadolinium is precipitated out as the oxalate, and
(e) the gallium is deposited in the metallic form by electrolysis.

A further solution to the object of the invention is that, after the precipitation of the troublesome impurities, first the gallium is separated out in the metallic form by electrolysis, and then the gadolinium is precipitated out as the oxalate.

DETAILED DESCRIPTION

The process of the invention has been extensively investigated, in particular with respect to the recovery of gadolinium and gallium which are present in a garnet in accordance with the formula $Gd_3Ga_5O_{12}$. To describe the process in some detail special reference will be made to this particular case, whereby it is understood of course that the expert can use this process for all other products which have similar properties.

The pretreatment to be given to the scrap depends of course on the form of the scrap. Generally the scrap has to be given a thermal treatment to convert or expel the organic and/or other volatile components by thermal means. It is understood of course that the remainder of a crystal growing melt and defective crystals which originate for example from the production of the starting material viz., $Gd_3Ga_5O_{12}$ can be broken down in size without any thermal treatment.

The thermal treatment, if it is necessary, must be carried out at a temperature of at least 400° C., preferably at least 600° C.

The organic constituents can be removed by means of a suitable extraction substance, for example trichlorethylene instead of by a thermal treatment.

The thermally treated scrap is ground down to a particle size less than 100 μm, preferably below 40 μm. Trials showed that coarse material—for example with a particle size of over 200 μm—not only dissolves slower and less completely than finer material with a particle size less than 100 μm, but the ability of the material to dissolve can diminish even further due to the long contact with the acid. Surprisingly then, the ability of the scrap to dissolve can be considerably increased, if, as specified above, it is finely ground. This grinding can be carried out by conventional means, either wet or dry, for example using a ball or crusher mill.

The finely ground product can be dissolved in a normal, strong mineral acid, however this is preferably done in concentrated hydrochloric acid, in particular using an acid concentration of 20-35 wt%. The solubility in nitric acid is also good, but the $NO_3^-$ ions can interfere with the later steps of the process, in particular with the precipitation of gallium. The ability to dissolve in sulphuric acid on the other hand is less. With a strong hydrochloric acid the dissolution takes place rapidly even with stoichiometric amounts of acid and scrap.

The best dissolution results with the finely ground scrap, in particular in strong hydrochloric acid, are obtained with stirring under reflux.

To obtain concentrated solutions a part of the water can be boiled off. After digestion of the scrap, the solution is filtered to remove insoluble particles. The residue is, if appropriate, collected and treated again with acid to reduce the losses before it is rejected.

The clear filtrate is then purified by one or more conventional processes, depending on the impurities which have to be removed. A method of purification which has given good results in the processing of GGG scrap is the separation of impurities by cementation.

This cementation is carried out for example in a temperature range of about 40°-60°, in that fine droplets of gallium are dispersed in the solution to be purified. The aim in this process is to precipitate out all elements with an electrochemical potential which makes them more noble than gallium, for example copper, lead and tin. The dispersion of gallium into fine droplets is achieved with the help of a suitable vibrator. If the gallium is present as fine droplets, the reaction surface is large, which allows rapid cementation.

If there is no excess acid in the solution, the quantity of gallium which goes into solution in the course of this purification process is negligible. Dissolved gallium would however not be lost. The impurities (copper, lead, tin etc.) are reduced and mostly form intermetallic compounds with gallium; this must be purified from time to time by means of conventional processes.

The purification reaction via cementation is rapid and complete, if an optimum dispersion of the gallium is achieved by stirring. Under these conditions copper for example is removed completely from the solution in less than 15 minutes. It is however recommended to extend the time of treatment to 30 minutes, in particular to 1 hour. The cementation can also be aided electrochemically.

After the stirrer is stopped, the gallium used to purify the solution settles quickly on the floor of the container and can be used again immediately for a new charge. The purified, clear solution is then ready for the precipitation of the gadolinium and gallium.

The troublesome impurities can be precipitated out as sulphides and then separated instead of by cementation. Sodium sulphide or hydrogen sulphide can be employed as the precipitating agent.

The precipitation of the gallium and gadolinium from the clear, purified solution can be done two ways, both of which involve the deposition of the gallium by electrolytic reduction to the metallic form and the precipitation of the gadolinium in the form of the oxalate.

Method (a)

The precipitation of gadolinium oxalate is carried out in an acidic medium. The pH of the purified solution is first adjusted to a value of 0.5–1.2, preferably 1, by addition of a base. This base can for example be potassium hydroxide or ammonium hydroxide, rather than sodium hydroxide as the oxalates of the first two dissolve more readily in an alkaline medium, which is an advantage for subsequent steps in the process. It is also of advantage to add a little hydrogen peroxide, to convert the iron ions present in the solution into the trivalent form by oxidation.

In order that the precipitation of the gadolinium is as complete as possible, oxalic acid or e.g. potassium oxalate is added, for example 1.5–3.5 times the stoichiometric amount which would be necessary to precipitate the gadolinium, preferably 1.7–2.5 times the stoichiometric amount needed. The temperature of the solution during the precipitation does not seem to play a decisive role; in this case the temperature was 50° C. The precipitation agent can be added solid or dissolved. During the precipitation of the gadolinium oxalate which begins after some delay, it is recommended to stir the solution slightly for a few hours, e.g., over night at room temperature. The oxalate obtained, viz., $Gd_2(C_2O_4)_3.10H_2O$ is separated from the mother liquor by conventional means, for example by centrifuging, and then rinsed with dilute oxalic acid (e.g., 6 g/l). The mother liquor and the rinsing water are then used in an alkaline medium as the electrolyte, to precipitate the gallium from it in the metallic form.

If the end product is to be as pure as possible, the gadolinium oxalate can be dissolved and precipitated a second time. For this, it is first dried at around 130° C., then calcined for example at 800° C. The gadolinium oxide $Gd_2O_3$ is then dissolved again in a mineral acid, preferably nitric acid. The solution is adjusted to have a pH of about 0.8–1.2, preferably by means of an ammonium hydroxide solution, and then filtered or centrifuged. The precipitation of the gadolinium is carried out as described above for the first precipitation, but with an extremely small excess of oxalic acid which is of the order of 20% less than the stoichiometric amount needed. The precipitate is then separated from the solution, rinsed with dilute oxalic acid, dried and calcined.

The result is a gadolinium oxide which has a purity level of 99.99%. The total yield from the process can exceed 95% of the gadolinium in the scrap.

The electrolysis of the gallium is possible both in an acidic or an alkaline medium. However the electrolysis in a basic medium is preferred. In contrast to electrolysis in an acidic medium, the remaining solution is almost completely free of gallium and can be thrown away. Surprisingly, in spite of the high chloride ion concentration, it has been possible to work with a basic medium thanks to the fact that suitable materials were found for the anodes, for example, graphite. The cathode is usually made of stainless steel. The pH of the mother liquor from the precipitation of the gadolinium oxalate is brought to a value of over 12 by the addition of an alkaline substance, for example a concentrated solution of potassium hydroxide. The use of sodium hydroxide is avoided, as a supersaturation of sodium oxalate can occur. The presence of oxalate ions in the solution during electrolysis has a positive effect, in particular on the lifetime of the graphite anode.

The parameters concerning the electrolytic process can vary within certain limits; these can be defined for example as follows:

(a) Current density (anodic and cathodic): 0.05–0.2 $A/cm^2$
(b) Voltage: 3–6 V
(c) Duration: hours–days
(d) Temperature: 40°–60° C.

The resultant gallium is purified as required, and can then be converted to the oxide by a well known method.

(Method b)

In this method, after the separation of the troublesome impurities, the gallium is precipitated electrolytically, and then the gadolinium precipitated out as the oxalate, whereby the conditions for precipitation described in method (a) are employed.

The solution which was purified for example by cementation is employed directly for electrolysis. If the amount of scrap corresponds stoichiometrically to the amount of hydrochloric acid added, then the atomic ratio of the ions is $(Cl^-)/(Gd^{3+}+Ga^{3+})=3$. A solution of this composition is very suitable for electrolysis. The coloumbic yield with respect to the deposition of gallium is not 100% as a part of the hydrochloric acid is also electrolysed, so that the atomic ratio of the above mentioned ions is 2.5–3.5.

The following parameters for electrolysis are to be taken as nominal values:
Anode: graphite
Cathode: gallium
Current density at cathode: 0.1–1 $A/cm^2$
Voltage: 10–15 V
Duration: hours–days
Temperature: 80°–90° C.

As the temperature rises markedly during the electrolytic process a cooling system must be provided. For reasons of safety the cell is cooled with a stream of an inert gas, e.g., nitrogen. As a result of this acidic electrolytic deposition of gallium, the main part, e.g., 80% is removed from the solution.

The metallic gallium obtained is then treated exactly as in method (a).

The gadolinium oxalate is precipitated in an acidic medium, as was described in method (a), from the mother liquor resulting from the electrolysis of gallium:

The pH of th solution is adjusted to 0.5–1.2, the requisite excess oxalic acid added etc. The rest of the gallium is recovered, e.g., by precipitation of GaOOH at a pH of about 7, or by recycling the previously evaporated solution.

Of the two methods described above the method (a) is preferred, as the precipitation of gallium by electrolysis of an alkaline solution is surprisingly easier and more complete. The electrolysis of an acidic solution (method (b)) always yields mother liquors which still contain a considerable amount of gallium. This must be recovered in some way or other, or the mother liquors must be otherwise utilised to be able to avoid a considerable loss of gallium.

Further features and advantages of the invention will now be explained in greater detail by means of the following example.

EXAMPLE

The scrap materials which can be used as the starting material for the process are particulate residues of charges for crystal growing, broken parts of crystals from all stages of preparation to wafers, and also fines or powder arising from grinding, polishing and laping the garnet $Gd_3Ga_5O_{12}$.

Round grinding fines fom the preparation of the GGG crystal were dried at 120° C. and then heated at 600° C. for a few hours to decompose the volatile impurities.

1000 g of fine particulate dry scrap all of which was <40 μm in size and containing 34% gallium and 46% gadolinium was boiled for 2 hours in 2100 ml of 35% hydrochloric acid with reflux. This corresponds to a charge of 99%.

After digestion of the scrap the undissolved part is filtered off and rinsed. This residue weighed 20 g when dry. This material is collected and then, as was mentioned earlier, digested once more.

The filtrate, including washing and rinsing water, 2300 ml in total, was treated with 4000 g metallic gallium at 50° C. for 45 min. In doing so the metal must be dispersed as finely as possible. In the cementration process the more noble elements present in the aqueous solution are separated out and partly dissolved in the gallium until saturated and then precipitated as intermetallic impurities or in an elemental form. The cementation can also be carried out with a much smaller amount of gallium. The metal can be used repeatedly until the necessary purification has been achieved.

The result of the purification process was a solution of 2400 ml containing 140 g/l gallium and 190 g/l gadolinium.

The pH was adjusted to a value of 1 by addition of 900 ml of 4 N potassium hydroxide solution, at the same time stirring well, and then approximately 20 ml of 30% hydrogen peroxide added to oxidize, e.g., the iron present. The precipitation of the gadolinium was carried out at 50° C. by addition of 1500 g of crystallized, technical grade oxalic acid ($C_2O_4H_2.2H_2O$) and the suspension stirred gently over night to achieve complete precipitation of the gadolinium oxalate.

The gadolinium oxalate $Gd_2(C_2O_4)_3.10H_2O$ was separated out by centrifuging, rinsed with about 200 ml dilute oxalic acid (6 g/l) and dried at 130° C. before converting to gadolinium oxide (520 g) by heating at 800° C. As was mentioned above, the gallium can be purified by precipitating in acid and renewed precipitation as the oxalate.

The liquid left over after centrifuging and the rinsing water from the first separation of gadolinium oxalate (3300 ml) was brought to a pH of 12 by adding 2300 g potassium hydroxide and stirring strongly. The 6000 ml of solution containing 55 g/l of gallium and 1 g/l of gadolinium was then electrolyzed at 60° C. using a stainless steel cathode and graphite anode, and using a current density of approximately 0.1 A/cm². After 48 h, 325 g of gallium had been deposited, and the electrolyte containing 0.4 g/l of gallium was thrown away. The precipitated metal represented scrap of 99.99% purity and can be converted directly to the oxide. The gadolinium content of the gallium lay below the detection limit of 0.3 $ppm_w$ of the mass spectrometer.

What is claimed is:

1. A process for the recovery and separation of gadolinium and gallium from scrap material of substances containing both of these elements basically in the form of oxides or compounds which can be transformed to the oxides including the steps of
   (a) grinding the scrap material to a particle size smaller than 100 μm,
   (b) dissolving the finely ground scrap in a strong, aqueous mineral acid,
   (c) precipitating out impurities,
   (d) precipitating the gadolinium as the oxalate, and
   (e) depositing the gallium in the metallic form by electrolysis.

2. A process according to claim 1 in which the starting material is given a thermal treatment at a temperature of at least 400° C. before being ground.

3. A process according to claim 1 in which the starting material is ground to a particle size of less than 40 μm.

4. A process according to claim 1 in which the finely ground starting material is dissolved in concentrated hydrochloric acid.

5. A process according to claim 1 in which the purification step (c) of the solution takes place by cementation of the more noble metals as gallium.

6. A process according to claim 5 in which the cementation is carried out by dispersing fine droplets of metallic gallium in the solution to be purified.

7. A process according to claim 1 in which the purification step (c) of the solution is carried out by precipitation of impurities as sulphides.

8. A process according to claim 1 in which the precipitation of gadolinium oxalate is carried out at a pH of 0.5–1.2, and wherein a quantity of oxalic acid is employed in an amount 1.5–3.5 times the stoichiometric amount of gadolinium in the solution.

9. A process according to claim 1 in which the gallium is deposited electrolytically in a basic medium with a high chloride ion content after the precipitation of gadolinium oxalate.

10. A process for the recovery and separation of gadolinium and gallium from scrap material of substances containing both of these elements basically in the form of oxides or compounds which can be transformed to oxides including the steps of
    (a) grinding the scrap material to a particle size smaller than 100 μm,
    (b) dissolving the finely ground material in a strong, aqueous mineral acid,
    (c) precipitating out impurities,
    (d) depositing the gallium electrolytically in the metallic form, and
    (e) precipitating the gadolinium as the oxalate.

* * * * *